Oct. 12, 1948.  J. FAIRBANKS  2,451,161
PRESSURE DEVICE FOR CAMERA MECHANISMS
AND FILLER INSERTS THEREFOR
Filed Dec. 19, 1945  4 Sheets-Sheet 1
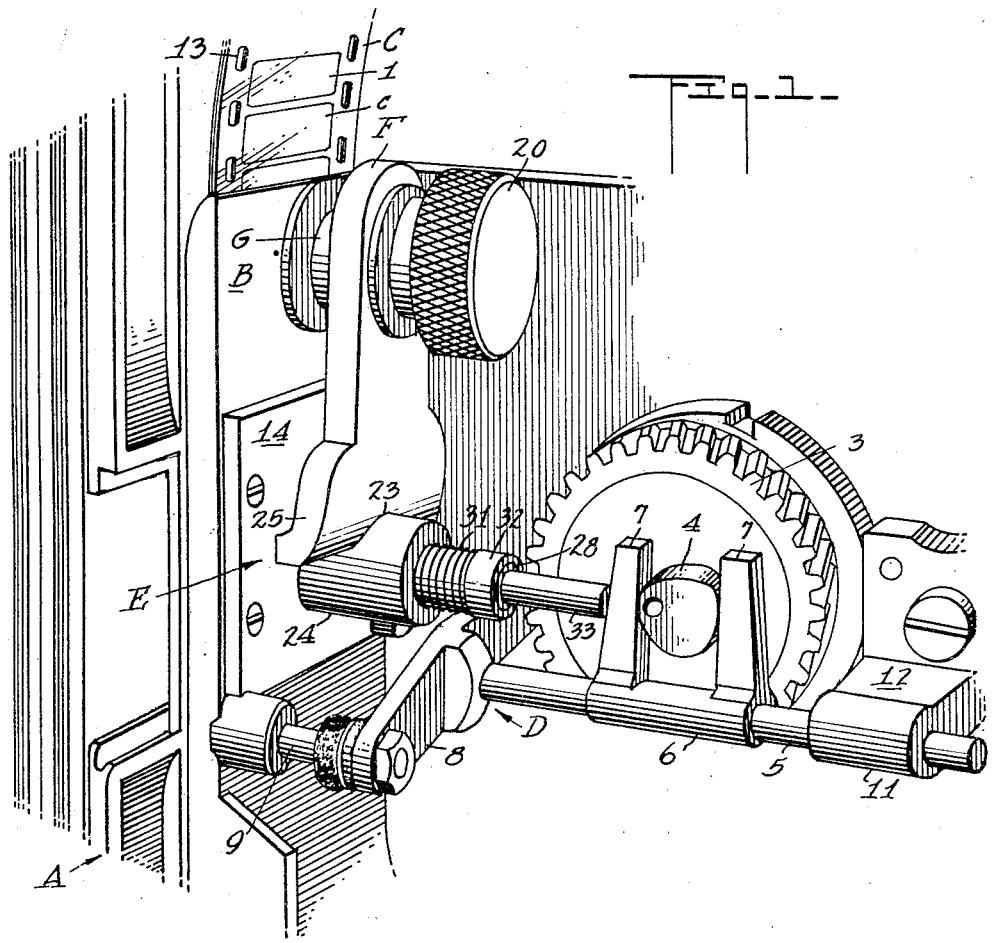
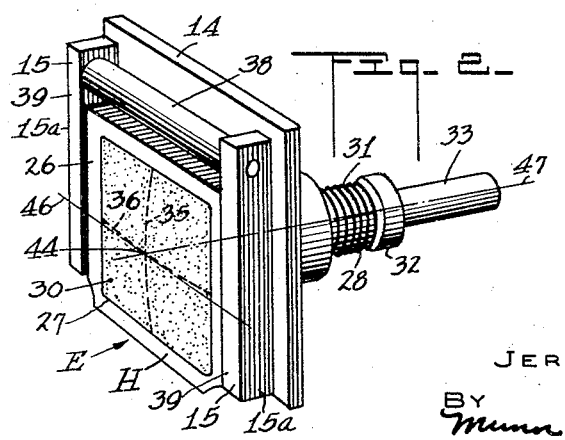
INVENTOR
JERRY FAIRBANKS
BY
Munn, Liddy & Glaccum
ATTORNEYS

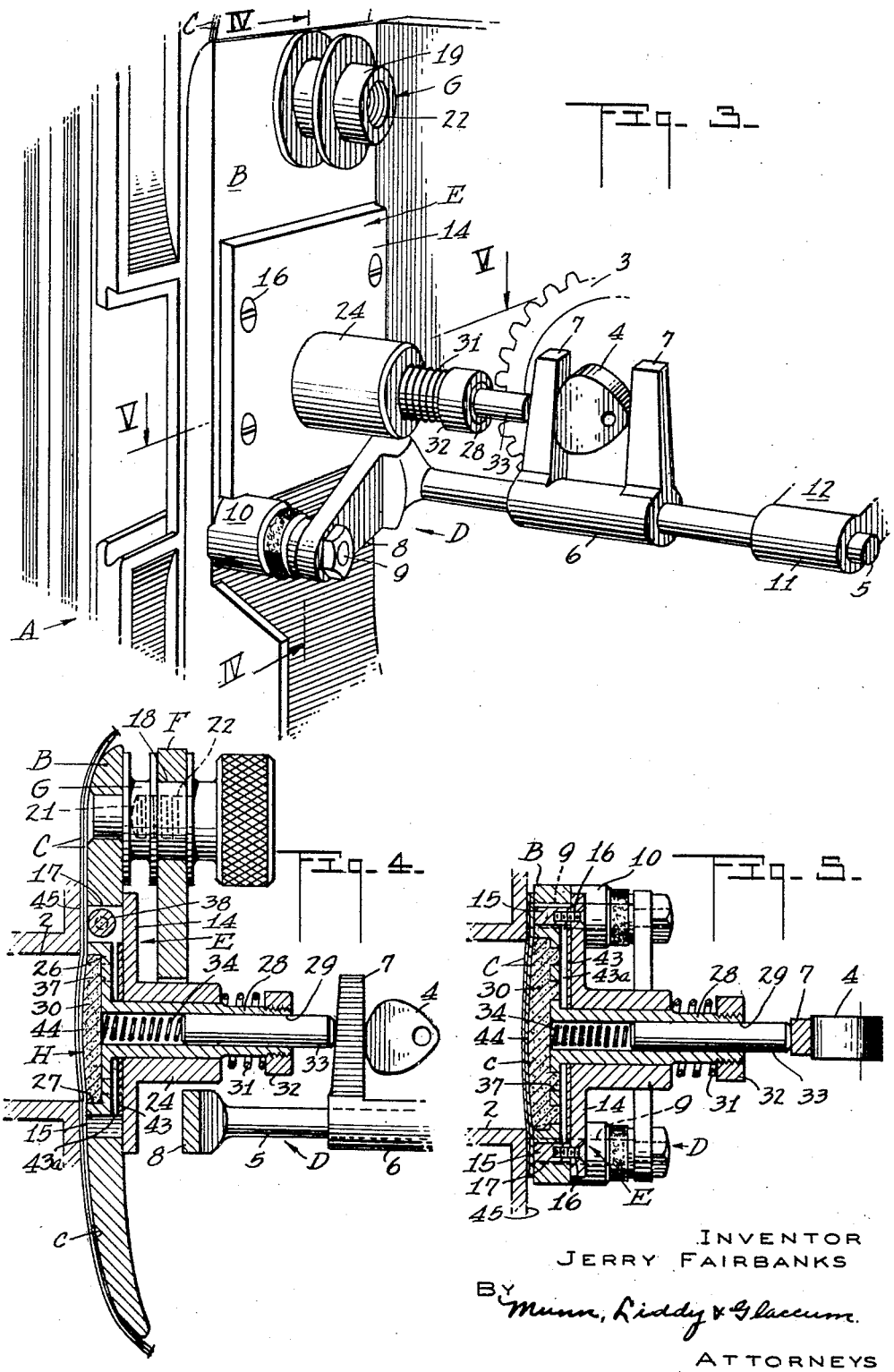

Oct. 12, 1948.  J. FAIRBANKS  2,451,161
PRESSURE DEVICE FOR CAMERA MECHANISMS
AND FILLER INSERTS THEREFOR
Filed Dec. 19, 1945  4 Sheets-Sheet 3
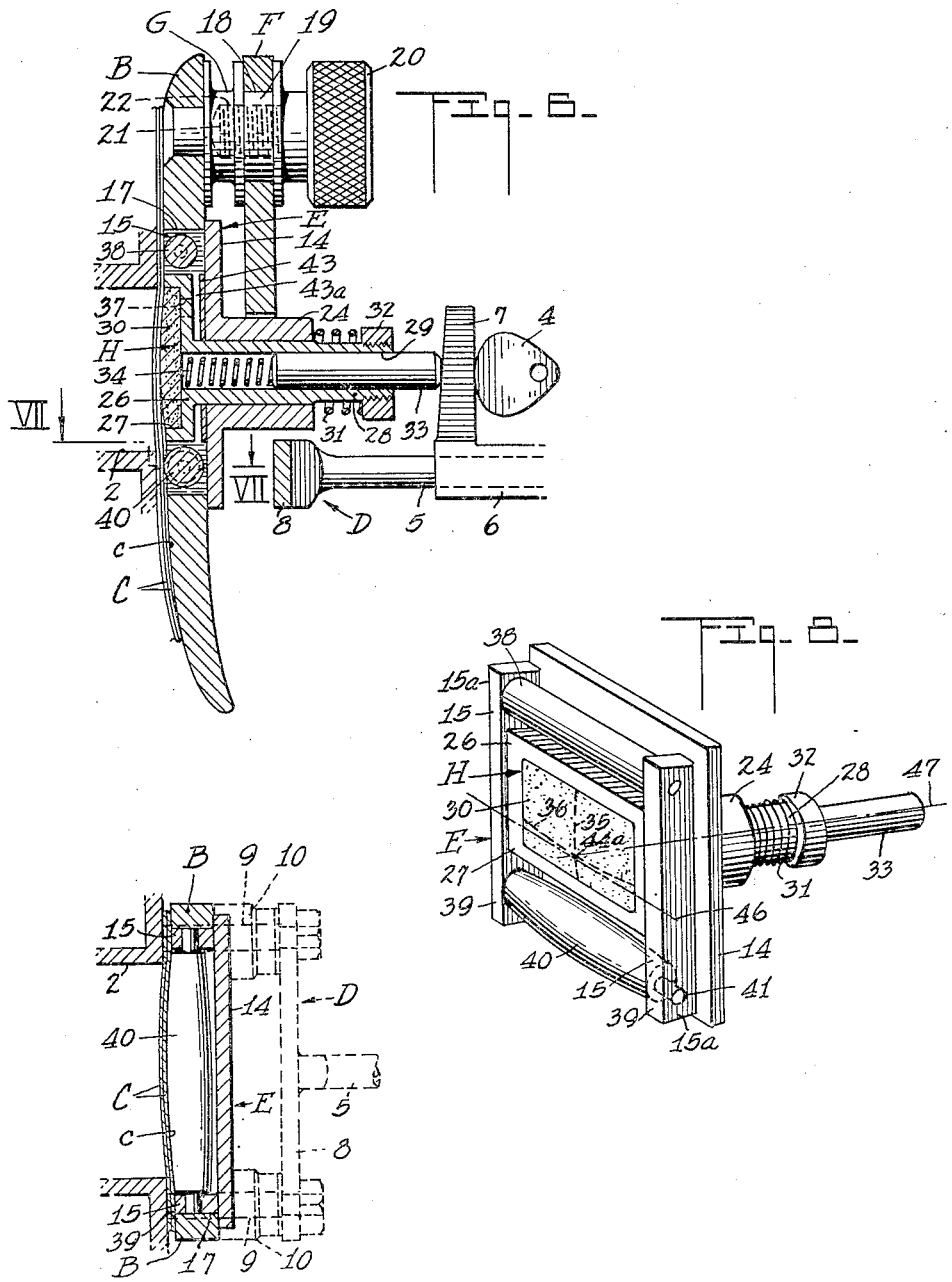
INVENTOR
JERRY FAIRBANKS
BY
Munn, Liddy & Glaccum
ATTORNEYS Patented Oct. 12, 1948

2,451,161

UNITED STATES PATENT OFFICE 2,451,161

PRESSURE DEVICE FOR CAMERA MECHANISM AND FILLER INSERTS THEREFOR

Jerry Fairbanks, Hollywood, Calif.

Application December 19, 1945, Serial No. 635,882

17 Claims. (Cl. 88—17)

The present invention relates to improvements in a pressure device for camera mechanism and a filler insert therefor. It consists of the combinations, constructions and arrangement of parts, all as hereinafter described and claimed.

An object of my invention is to provide an improved mechanism for holding two overlying films in contact with each other during the instant of exposure. My mechanism, when installed in a camera, will provide a pair of equally sharp photographic negatives in absolute registration for two-color process work, such as the Bipack method, or any photographic process dependent upon these requirements.

A further object resides in the provision of a pressure device for a camera mechanism, which will exert uniform back pressure, holding the two films in contact during the exposure interval.

It is further proposed to provide a device of the character described that is designed as an adapter to fit into a standard Mitchell 35 mm. motion picture camera. However, I do not wish to be limited to this particular make and size of camera.

Another object of my invention is to provide a pressure device for a camera mechanism, which is particularly adapted in the making of sound motion pictures, wherein the camera noise must be reduced to the minimum.

A still further object is to provide an improved pressure plate and method of forming a filler insert for the plate. The proper curve for holding the two films in absolute contact without distortion, and to entirely eliminate air spaces between the films, is not one that can be machined or computed. I propose to disclose an improved method of securing the proper curvature on the film-engaging face of the pressure plate.

The conventional method for holding the films in contact does not provide for such an accurate and over-all evenly distributed pressure. This allows intermittent air spaces between the films to give an in and out of focus effect, called "breathing," and is the deficiency of methods now in use.

In order to obtain the correct curvature on the film-engaging surface of the pressure plate for the individual camera on which it is going to be used, I place two pieces of films in the camera gate in the conventional manner. A plastic mixture of material for the pressure plate insert then is forced into a cavity in back of the films and against the latter until the material completely fills the space behind the camera aperture. The film itself forms the proper curvature to give an even, over-all pressure and hold the two films in absolute contact. Upon hardening of the material, the proper curvature on the pressure plate is attained.

Other objects and advantages will appear as the specification continues, and the novel features will be particularly set forth in the claims hereunto annexed.

For a better understanding of my invention, reference should be had to the accompanying drawings, forming part of this application, in which:

Figure 1 is a fragmentary perspective view of a Mitchell 35 mm. motion picture camera showing my mechanism operatively applied thereto, the camera mechanism being illustrated in a period of film movement;

Figure 2 is a perspective view of my mechanism removed from the camera in its entirety;

Figure 3 is a view similar to Figure 1, but showing the retaining clamp removed and the camera mechanism in a position for exposure;

Figure 4 is a vertical section taken along the line IV—IV of Figure 3;

Figure 5 is a horizontal sectional view taken along the line V—V of Figure 3;

Figure 6 is a vertical section similar to Figure 4, but disclosing a modified form of my pressure plate;

Figure 7 is a horizontal section taken along the line VII—VII of Figure 6;

Figure 8 is a perspective view of my modified pressure plate.

Figure 9:
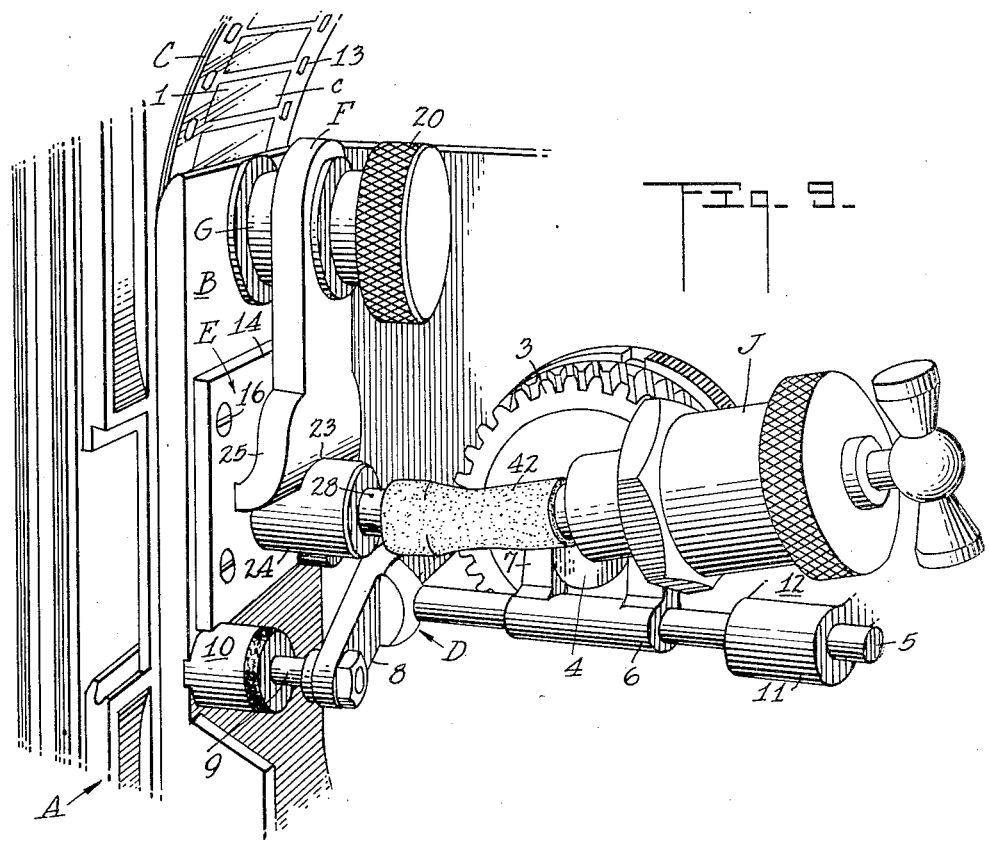
Figure 9 is a perspective view illustrating a pressure gun adapted to force the plastic material into the pressure plate proper to form a filler insert.
Figure 10:
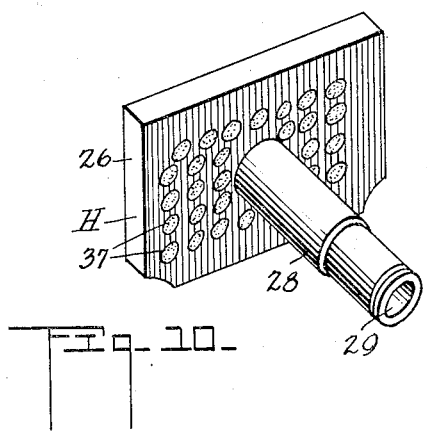
Figure 10 is a rear perspective view of my improved pressure plate.

Referring now to the drawings in detail, it will be noted that I have illustrated a portion of a standard Mitchell 35 mm. motion picture camera, indicated generally at A. The structure thereof includes a camera gate B over which a pair of films C are guided. These films are advanced intermittently in the conventional manner so as to successively present the frames 1 in registration with the camera aperture 2, the latter being arranged on the opposite side of the films from that of the camera gate.

The mechanism for periodically locking the films against movement during times of exposure is indicated generally at D, and the details thereof now will be described. A driven gear 3 has a cam 4 secured to one face thereof, and this cam rotates with the gear. An actuating rod 5 has a fork 6 fixed thereto, and the arms 7 of this fork straddle the cam 4 in the manner shown. The actuating rod 5 is thus reciprocated in a direction first toward and then away from the camera gate B when the camera mechanism is operated.

A cross-head 8 is secured to the rod 5 and has a pair of forwardly-projecting registration pins 9 thereon, which extend through bearings 10. These bearings support the cross-head and the front end of the actuating rod 5, while the rear section of the latter is guided in a bearing 11 fashioned in a fixed bracket 12.

Figure 1 illustrates the camera mechanism in a period of film movement, the registration pins 9 having been withdrawn from the marginal slots 13 of the films C by the cam 4. Figures 3 to 7, inclusive, show the camera mechanism in positions for exposure, with the cam holding the registration pins in the forward position. It will be understood that these registration pins enter the marginal slots 13 of the films C to lock the latter against movement during periods of exposure.

A master pressure plate 14 has a pair of parallel guide rails 15 fastened thereto by screws 16, or other suitable fastening means. The camera gate B is provided with a rectangular opening 17. The height of this opening is the same as the vertical length of the rails 15, while the opening width is coextensive with the horizontal distance between the outer edges 15a of the two rails.

The mechanisms thus far described are found in the standard Mitchell 35 mm. motion picture camera and form no part of the present invention, except insofar as they cooperate with the parts that now will be set forth.

My pressure device for a camera mechanism is designated generally at E. Figure 1 shows this mechanism applied in operative position in the camera, while Figure 2 discloses it removed from the camera. The master pressure plate 14 and rails 15 form part of my assembled pressure device E.

In order to hold my pressure device in position, I have made use of a retaining clamp F. This clamp is fashioned with an opening 18 therein, which slides over the cylindrical end 19 of a stud G. The latter is anchored to and projects from the camera gate B. A cap screw 20 has a shank 21 that is adjustable in a threaded bore 22 formed in the stud G.

It will be observed that the lower end of this clamp is bifurcated at 23 so as to fit over a shaft bearing 24 projecting rearwardly from the master rail-carrying plate 14. Fingers 25 on the bottom of the clamp bear against the rear surface of the plate 14. Adjustment of the cap screw 20 will allow the master rail-carrying pressure plate 14 to be adjusted relative to the camera gate B and the films C.

Referring more particularly to Figures 2, 4, 5 and 10, it will be seen that I provide a pressure plate proper, indicated at H. This pressure plate is disposed between the guide rails 15 and includes a rectangular plate 26 formed with a cavity 27 therein. A tubular shaft 28 projects from the plate 26 and is guided in the shaft bearing 24. The bore 29 of this tubular shaft communicates with the cavity 27 before a filler insert 30 is disposed in the cavity.

In order to yieldingly hold the pressure plate H in retracted position during periods of film movement, I have interposed a spring 31 between the shaft bearing 24 and a retaining nut 32, the latter being threaded onto the tubular shaft 28. A plunger 33 is slidably disposed in the bore 29 and bears against one arm 7 of the fork 6. It will be noted that a spring 34 is mounted in the bore 29 between the filler insert 30 and the plunger 33. This spring-loaded plunger serves to apply pressure against the films C during periods of exposure by moving my pressure device E forward as the camera cam 4 actuates the plunger. The tension of the spring 31 is overcome during this forward movement of the pressure plate H.

It will be noted from Figures 2, 4 and 5 that the filler insert 30 is the exact size of the photographic aperture 2 and also the film frames 1. These views disclose that the insert is crowned vertically (Figure 4) and also horizontally (Figure 5). In Figure 2, the vertical crown is indicated by the dotted line 35, while the horizontal crown is illustrated by the dotted line 36.

The cavity 27 extends substantially one-half the thickness of the rectangular plate 26. A number of holes 37 are drilled to allow escapement of part of the plastic material constituting the filler insert during its formation. The material remaining in these openings, when hardened, serve to anchor the insert to the plate 26.

Referring to Figures 2 and 4, it will be observed that I mount a roller 38 between the upper ends of the guide rails 15. This roller has a uniform diameter throughout its length and is arranged tangent to the front faces 39 of these rails. The latter bear against the films C when the pressure plate H is forced forwardly, as indicated in Figure 5.

As previously pointed out in the objects, the proper curvature on the film-engaging face of the filler insert 30 is very important in order to prevent an in and out focus effect from resulting. The method of forming this insert now will be described.

The mechanism is placed in the camera in the manner illustrated in Figure 9. The spring 31, retaining nut 32, plunger 33 and spring 34 are removed at this time. A pressure gun J is affixed to the tubular shaft 28 by means of a flexible hose 42; which, of course, communicates with the bore 29 leading to the cavity 27.

This gun contains a mixture of cascamite and flour, mixed to a consistency to allow it to be forced through the bore 29, and yet heavy enough to give almost immediate hardening. Two pieces of films C are placed in the camera gate in the conventional manner. These films are transparent, so the flow of material can be watched through the aperture 2 from the front of the camera.

As pressure is applied, the plastic material fills out the cavity 27 until it has completely filled the space behind the camera aperture 2. The films themselves slightly bulge and form the proper curvature to give an even, over-all pressure and hold the two films in absolute contact. A thin coating of oil is placed on the surface c of the rearmost film in order to prevent the material from sticking thereto.

The holes 37 drilled in the back of the rectangular frame 26, allow the overflow material to make its way out the back; and at the same time provides a firm anchorage for holding the insert in place upon hardening. Once the plastic material has been inserted to properly fill the cavity 27, the mechanism is allowed to stand until the material has set.

Upon removal from the camera, the proper curvature has been attained to fit the individual camera in which the pressure plate is going to be used. The excess filler material, which has exuded from the holes 37, is removed.

The mechanism of my pressure device E is then reassembled, and a shim 43 (see Figures 4 and 5) is inserted between the back of the plate 26 and the front of the master plate 14. The thickness of this shim is sufficient to make the point 44 of curvature in the insert (see Figure 2) at exactly the same level as the faces 39 of the guide rails 15 when the mechanism is in the retracted position (Figure 2). The pressure plate H is disposed in its forward position in Figures 4 and 5, and a space 43a is thus created between the plate 26 and the shim 43, which allows the pressure plate to move slightly rearward when the cam 4 is rotated to the position shown in Figure 1.

Thus, when the mechanism is in the relaxed position, or film-movement position, the crown at 44 provides the same amount of pressure to the center of the films as the rails 15 provide to the sides. When fitted into the camera movement, this mechanism is adjusted so that the distance between the surface of the three contact points, namely, the guide rail faces 39 and the highest point 44 of the crown, are exactly .012 of an inch from the front aperture plate surface 45. This distance allows for free movement of the two films through the camera and yet provides a firm guide therefor, inasmuch as the combined thickness of the two films is also .012 of an inch.

Figure 2 shows a line 46, which is disposed in the plane defined by the front rail faces 39. The pressure plate H is in relaxed position in this view, and the line 46 passes through the highest point 44 of the crown. Also, the center line 47 of the plunger 33 passes through the highest point 44 on the face of the filler insert.

Figures 6 to 8, inclusive, show a modification of my pressure device E. The same reference numerals and letters have been applied to corresponding parts in the two forms.

In this modified form, a second roller 40 is incorporated in the master plate 14. This roller is journalled in bearing holes 41 formed in the lower sections of the guide rails 15, supplanting and replacing the lower portion of the pressure plate H sufficiently to allow the roller to rotate freely.

The roller 40 differentiates from the parallel surface roller 38 at the top of the plate in that it has a crowned center. At its outer edges, the roller 40 is the same height as the guide rails 15, increasing in diameter to a point midway between the two guide rails, where its diameter is increased .0035 of an inch.

The purpose and advantage of incorporating this second roller is twofold. First of all, it decreases the surface of the pressure plate itself, which is actuated by the camera mechanism. This decrease in the surface area cuts down the sound of the mechanism in proportion to the decrease in area, which is particularly advantageous in the making of sound motion pictures. In such work the camera noise must be held to a minimum.

With the roller 40 in place, the second advantage resides in the fact that the pressure plate H itself can be adjusted so that in its fully retracted position (see Figure 8) it clears the films C entirely. This view illustrates the line 46 as being disposed in the plane of the front rail faces 39. The highest point of curvature 44a is disposed rearwardly of the line 46, since the pressure plate is fully retracted. In my first form, the highest point of curvature 44 retracts only to a plane passing through the front rail faces 39.

The crown of the roller 40 in the modification holds the films C in place in the center during the periods of film movement, eliminating the necessity of doing so with the pressure plate itself. This not only decreases the wear on the center of the pressure plate, but eliminates all chance of scratching the celluloid side of the film.

While I have shown only the preferred forms of my invention, it should be understood that various changes, or modifications, may be made within the scope of the appended claims without departing from the spirit thereof.

I claim:

1. The combination with a motion picture camera having a film gate, a camera aperture, and means for intermittently releasing a pair of superimposed films having registering frames for movement along the camera gate and past the aperture to expose successive frames of the films, of a plate for moving one film against the other into absolute contact therewith throughout the entire area of registering film frames during the momentary period of rest between film movements, a cam-actuated plunger for forcing the plate against the films during each period of rest, a spring interposed between the plate and plunger for urging the latter away from the plate during periods of rest between film movements, and spring means for retracting the plate relative to the films during periods of film movement.

2. In a device of the type described, a plate having a crowned face to press a pair of superimposed films having registering frames into absolute contact with each other throughout the entire area of registering film frames during periods of exposure, a tubular shaft for supporting the plate, a bearing for slidably receiving the shaft, yielding means exerting a force on the shaft for retracting the plate relative to the films, a plunger slidably mounted in the tubular shaft, a spring interposed between the plate and the plunger, and a rotating cam for moving the plunger to yieldingly urge the plate against the films for holding them in absolute contact with each other during periods of exposure.

3. In a pressure device for a camera mechanism, a master plate mounted in a camera gate and having a pair of film-guiding rails thereon, a pressure plate disposed between the rails and formed with a film-pressing surface, and means for mounting the pressure plate for movement toward and away from the master plate.

4. In a pressure device for a camera mechanism, a master plate mounted in a camera gate and having a pair of film-guiding rails thereon, the rails having film-engaging faces, a pressure plate disposed between the rails and formed with a film-pressing surface crowned both vertically and horizontally, means for moving the pressure plate away from the master plate to bear against a pair of superimposed films guided in the gate during periods of exposure, means for moving the pressure plate into retracted positions relative to the films during periods of film movement.

5. In a pressure device for a camera mechanism, a master plate mounted in a camera gate and having a pair of film-guiding rails thereon, the rails having film-engaging faces, a pressure plate disposed between the rails and formed with a film-pressing surface crowned both vertically and horizontally, means for moving the pressure plate away from the master plate to bear against a pair of superimposed films guided in the gate during periods of exposure, means for moving the pressure plate into retracted positions relative to the films during periods of film movement, the highest point of the crown being disposed in a plane defined by the film-engaging faces of the rails when the pressure plate is moved into retracted position, whereby the guide rails and the highest point of the crowns will bear against the films during periods of film movements along the gate.

6. In a pressure device for a camera mechanism, a master plate mounted in a camera gate and having a pair of film-guiding rails thereon, the rails having film-engaging faces, a pressure plate disposed between the rails and formed with film-pressing surface crowned both vertically and horizontally, means for moving the pressure plate away from the master plate to bear against a pair of superimposed films guided in the gate during periods of exposure, means for moving the pressure plate into retracted positions relative to the films during periods of film movement, and a roller of uniform diameter extending between the rails with the ends of the roller disposed tangent to the film-engaging faces of the rails.

7. In a pressure device for a camera mechanism, a master plate mounted in a camera gate and having a pair of film-guiding rails thereon, the rails having film-engaging faces, a pressure plate disposed between the rails and formed with a film-pressing surface crowned both vertically and horizontally, means for moving the pressure plate away from the master plate to bear against a pair of superimposed films guided in the gate during periods of exposure, means for moving the pressure plate into retracted positions relative to the films during periods of film movement, and a crowned roller extending between the rails with the ends of the roller disposed tangent to the film-engaging faces of the rails, the crown of the roller projecting beyond the film-engaging faces of the rails.

8. In a pressure device for a camera mechanism, a master plate mounted in a camera gate and having a pair of film-guiding rails thereon, the rails having film-engaging faces, a pressure plate disposed between the rails and formed with a film-pressing surface crowned both vertically and horizontally, means for moving the pressure plate away from the master plate to bear against a pair of superimposed films guided in the gate during periods of exposure, means for moving the pressure plate into retracted positions relative to the films during periods of film movement, the highest point of the crown being disposed rearwardly of a plane defined by the film-engaging faces of the rails when the pressure plate is moved into retracted position, and a crowned roller extending between the rails with the ends of the roller disposed tangent to the film-engaging faces of the roller, the crown of the roller projecting beyond the film-engaging faces of the rails, whereby the rails and the crown of the roller will bear against the films during periods of film movement.

9. A pressure plate having a cavity formed in the front face thereof, and openings extending from the bottom of the cavity to the rear face of the plate, and a filler insert entirely filling the cavity and having portions anchored in the openings.

10. In combination, a camera gate having an opening extending therethrough, a master plate disposed over the opening and having film guide rails projecting therefrom through the gate opening, a clamp removably secured to the camera gate and bearing against a master plate for holding the latter in place, and a pressure plate carried by the master plate and being movable toward and away from the master plate.

11. In a pressure device for a camera mechanism, a master plate mounted in a camera gate and having a pair of film-guiding rails thereon, the rails having film-engaging faces, a pressure plate disposed between the rails and formed with a film-pressing surface crowned both vertically and horizontally, means for moving the pressure plate away from the master plate to bear against a pair of superimposed films guided in the gate during periods of exposure, means for moving the pressure plate into retracted positions relative to the films during periods of film movement, and a crowned roller extending between the rails, the crown of the roller projecting beyond the film-engaging faces of the rails.

12. In a pressure device for a camera mechanism, a master plate mounted in a camera gate and having a pair of film-guiding rails thereon, the rails having film-engaging faces, a pressure plate disposed between the rails and formed with a film-pressing surface crowned both vertically and horizontally, means for moving the pressure plate away from the master plate to bear against a pair of superimposed films guided in the gate during periods of exposure, means for moving the pressure plate into retracted positions relative to the films during periods of film movement, the highest point of the crown being disposed rearwardly of a plane defined by the film-engaging faces of the rails when the pressure plate is moved into retracted position, and a crowned roller extending between the rails, the crown of the roller projecting beyond the film-engaging faces of the rails, whereby the rails and the crown of the roller will bear against the films during periods of film movement.

13. In a pressure device for a camera mechanism, a master plate mounted in a camera gate and having a pair of film-guiding rails over which a pair of superimposed films are movable, a pressure plate disposed between the rails and formed with a film-pressing surface, a tubular shaft secured to the pressure plate for supporting the latter, a bearing on the master plate slidably receiving the shaft, a spring arranged between the master plate and the tubular shaft exerting a force on the latter for retracting the pressure plate relative to the films, a plunger slidably mounted in the bore of the tubular shaft, and a spring interposed between the pressure plate and the plunger for urging the pressure plate toward the films.

14. In a pressure device for a camera mechanism, a master plate mounted in a camera gate and having a pair of film-guilding rails over which a pair of superimposed films are movable, a pressure plate disposed between the rails and formed with a film-pressing surface, a tubular shaft secured to the pressure plate for supporting the latter, a bearing on the master plate slidably receiving the shaft, a spring arranged between the master plate and the tubular shaft exerting a force on the latter for retracting the pressure plate relative to the films, a plunger slidably mounted in the bore of the tubular shaft, and a spring interposed between the pressure plate and the plunger for urging the pressure plate toward the films, the first-named spring being stronger than the second-named spring.

15. In a pressure device for a camera mechanism, a master plate mounted in a camera gate and having a pair of film-guiding rails over which a pair of superimposed films are movable, a pressure plate disposed between the rails and formed with a film-pressing surface crowned both vertically and horizontally, a tubular shaft secured to the pressure plate for supporting the latter, a bearing on the master plate slidably receiving the shaft, a spring arranged between the master plate and the tubular shaft exerting a force on the latter for retracting the pressure plate relative to the films, a plunger slidably mounted in the bore of the tubular shaft, and a spring interposed between the pressure plate and the plunger for urging the pressure plate toward the films.

16. In a pressure device for a camera mechanism, a master plate mounted in a camera gate and having a pair of film-guiding rails over which a pair of superimposed films are movable, a pressure plate disposed between the rails and formed with a film-pressing surface, a tubular shaft secured to the pressure plate for supporting the latter, a bearing on the master plate slidably receiving the shaft, a spring arranged between the master plate and the tubular shaft exerting a force on the latter for retracting the pressure plate relative to the films, a plunger slidably mounted in the bore of the tubular shaft, a spring interposed between the pressure plate and the plunger for urging the pressure plate toward the films, and a shim placed between the pressure plate and the master plate to limit movement of the former toward the latter.

17. In a pressure device for a camera mechanism, a master plate mounted in a camera gate and having a pair of film-guiding rails over which a pair of superimposed films are movable, a pressure plate disposed between the rails and formed with a film-pressing surface, a tubular shaft secured to the pressure plate for supporting the latter, a bearing on the master plate slidably receiving the shaft, one end of the tubular shaft projecting beyond the bearing and having a retaining nut threaded thereon, a spring encircling said end of the shaft and arranged between the bearing and the retaining nut and exerting a force for retracting the pressure plate relative to the films, a plunger slidably mounted in the bore of the tubular shaft and projecting herefrom, and a spring disposed in the bore of the tubular shaft and interposed between the pressure plate and the plunger for urging the pressure plate toward the films.

JERRY FAIRBANKS.

REFERENCES CITED

The following references are of record in the file of this patent:

UNITED STATES PATENTS

| Number | Name | Date |
| --- | --- | --- |
| 666,396 | Schneider | Jan. 22, 1901 |
| 1,031,820 | Schneider | July 9, 1912 |
| 1,231,360 | Howell | June 26, 1917 |
| 1,692,092 | Oehmichen | Nov. 20, 1928 |
| 1,738,095 | Carleton | Dec. 3, 1929 |
| 1,888,527 | Edouart | Nov. 22, 1932 |
| 1,918,505 | Wallenberg | July 18, 1933 |
| 1,927,887 | Crespinel | Sept. 26, 1933 |
| 2,014,449 | Needham | Sept. 17, 1935 |
| 2,357,707 | Tondreau et al. | Sept. 5, 1944 |
| 2,357,950 | Goessling | Sept. 12, 1944 |